(12) United States Patent
Kim et al.

(10) Patent No.: US 6,252,640 B1
(45) Date of Patent: Jun. 26, 2001

(54) METHOD FOR MANUFACTURING A WIDE BAND POLARIZATION FILM

(75) Inventors: Sung Tae Kim, Seoul; Tae Min Kim; Yang Kook Kim, both of Anyang-Shi; Hee Nam Hwang, Sungnam; In Sun Kim, Ansan-Shi, all of (KR)

(73) Assignee: LG Cable & Machinery Ltd., Seoul (KR)

( * ) Notice: Subject to any disclaimer, the term of this patent is extended or adjusted under 35 U.S.C. 154(b) by 0 days.

(21) Appl. No.: 09/205,932

(22) Filed: Dec. 4, 1998

(30) Foreign Application Priority Data

Jan. 10, 1998 (KR) ........................................ 98-498

(51) Int. Cl.$^7$ ............................ G02F 1/1335; G02F 1/13; C09K 19/02
(52) U.S. Cl. ............................ 349/96; 349/175; 349/185; 349/187
(58) Field of Search ............................ 349/96, 98, 175, 349/185, 187

(56) References Cited

U.S. PATENT DOCUMENTS

| | | | |
|---|---|---|---|
| 5,235,443 | 8/1993 | Barnik et al. | 359/37 |
| 5,506,704 | 4/1996 | Broer et al. | 359/63 |
| 5,691,789 | * 11/1997 | Li et al. | 349/98 |
| 5,793,456 | * 8/1998 | Broer et al. | 349/98 |
| 5,825,444 | * 10/1998 | Broer et al. | 349/98 |
| 5,929,956 | * 7/1999 | Neijzen et al. | 349/113 |
| 5,948,831 | * 9/1999 | Broer et al. | 522/182 |
| 5,999,243 | * 12/1999 | Kameyama et al. | 349/185 |
| 6,057,008 | * 5/2000 | Schwalb et al. | 428/1.1 |
| 6,061,108 | * 5/2000 | Anderson et al. | 349/98 |

FOREIGN PATENT DOCUMENTS 0 606 939    1/1994   (EP) .

* cited by examiner

Primary Examiner—William L. Sikes
Assistant Examiner—Tarifur R. Chowdhury
(74) Attorney, Agent, or Firm—Long Aldridge & Norman LLP

(57) ABSTRACT

The present invention relates to a method for manufacturing a polarization film for a liquid crystal display and, more particularly, to a method for manufacturing a polarization film having improved wide band characteristics and improved reflectivity by binding together plural liquid crystal films having different selective light-reflecting central wavelengths.

24 Claims, 3 Drawing Sheets

METHOD FOR MANUFACTURING A WIDE BAND POLARIZATION FILM

FIELD OF THE INVENTION

The present invention relates to a method for manufacturing a polarization film for a liquid crystal display (LCD) and, more particularly, to a method for manufacturing a polarization film having improved wide band characteristics and improved reflectivity by binding together plural liquid crystal films having different selective light-reflecting central wavelengths.

BACKGROUND OF THE INVENTION

In the current pictorial information era, pictorial displaying equipments as media for transmitting information have been used. Particularly, in response to the demands for personification of displaying equipments, which act as interfaces between human beings and computers, and for space economization, a variety of flat screens or flat-panel displays including LCD, plasma display panel (PDP), electroluminescence (EL) and the like have been developed to replace the conventional displays and, particularly, relatively large and voluminous cathode ray tubes. The advancement of the technology for liquid crystal displays with characteristics of thinness, low voltage drive and low power consumption has attracted the most intense interest and, as a result, the color picture quality of some liquid crystal displays has been improved so as to satisfactorily compare with some forms of cathode ray tubes.

Generally, a liquid crystal display includes a liquid crystal layer disposed between glass plates having transparent electrodes. The glass plates also have polarization films on their front and back surfaces. The polarization films used for this kind of liquid crystal display are typically made by adsorbing iodine or special dyestuff onto polyvinyl alcohol films and then stretching the films in a certain direction. Such polarization films have a low mechanical strength in the direction of the transmission axis and tend to have a lower polarizing performance because of shrinkage by heat or moisture and, therefore, cannot be put to practical use as a polarizer.

One solution to this problem is a structure wherein cellulose acetate films as supports are fixed by interposed binder layers.

Moreover, because a polarization film based on polyvinyl alcohol produces a linear polarized light by absorbing the light oscillating only in one direction and transmitting the light oscillating in the other direction, the theoretical efficiency of such a polarization film can not exceed 50%. This is the biggest factor lowering the efficiency of LCDs. In addition, as polyvinyl alcohol is a water-soluble polymer, it has poor resistance to water and heat and can deteriorate the durability of the polarization film. As an effective means for improving water- and heat-resistance, there is employed a formalization and heat-treating process in which a cross-linked reaction with boric acid or glyoxal takes place to reduce the OH radicals.

The polarization film of cholesteric liquid crystals can improve the drawbacks of the conventional polarization film. The cholesteric liquid crystals have a selectively reflecting characteristic by which they reflect only the circular polarized light, the traveling direction of which coincides with the twisted direction of the spiral structure of the cholesteric liquid crystals and the wavelength of which is identical to the spiral pitch of the liquid crystals. The advantage of this selectively reflecting character can be used to manufacture a polarization film that can convert an unpolarized light with a certain wavelength band into a specific circular polarized light. This is to say, when an unpolarized light, which includes the right circular polarized light and the left circular polarized light at equal proportions, is projected into a cholesteric liquid crystal film having a levorotatory or dextrorotatory structure, the circular polarized light in agreement with the spiral direction of the crystal structure is reflected and the circular polarized light in the opposite direction is transmitted. The transmitted circular polarized light is converted into a linear polarized light by passing it through a quarter wave ($\lambda/4$) retardation film. On the other hand, the reflected circular polarized light changes its polarization direction through re-reflection on a reflector plate and then is projected back into the liquid crystal film.

Such a method of using cholesteric liquid crystal film as a polarization film could increase the brightness by two times that of a conventional absorption type polarization film capable of absorbing only 50% of the light because of the theoretical absence of light loss.

The backlight used for LCDs, however, mainly emits the light having the visible band (400–800 nm) representing the chromatic range. Therefore, when only one kind of cholesteric liquid crystal monomer is employed, the single fixed spiral pitch of the cholesteric liquid crystal limits the polarizing ability of the light having the wavelength corresponding to the spiral pitch of the liquid crystal, with the light having the remaining wavelengths transmitting through the film as unpolarized light, thereby degrading the picture quality.

A need, therefore, exists for an improved method of manufacturing a polarization film having a high polarizing efficiency in a simple process, as well as a novel raw material for the polarization film.

SUMMARY OF THE INVENTION

An object of the present invention, which was devised to resolve the problems of the conventional art as described above, is to provide a method for manufacturing a polarization film that can fully cover the visible light emitted from the backlight due to the laminated structure of plural liquid crystal films having selective light-reflecting central wavelengths different from one another.

Another object of the present invention is to provide a liquid crystal display element having improved luminance.

The above objects of the invention may be achieved by a method for manufacturing a polarization film having wide band characteristics, comprising the steps of forming two or more cholesteric liquid crystal films having selective light-reflecting central wavelengths different from one another comprising forming a coated liquid crystal layer by coating cholesteric liquid crystals having selective light-reflecting central wavelengths different from one another on respective substrates, adding photopolymerization initiator to the coated liquid crystal layer and irradiating the coated liquid crystal layer; and binding together the two or more liquid crystal films so that their selective light-reflecting central wavelengths do not neighbor one another.

The above objects of the invention may also be achieved by a method for manufacturing a polarization film having wide band characteristics, comprising the steps of forming two or more cholesteric liquid crystal films having selective light-reflecting central wavelengths different from one another comprising forming a coated liquid crystal layer by coating cholesteric liquid crystals having selective light-reflecting central wavelengths different from one another on respective substrates, adding photopolymerization initiator to the coated liquid crystal layer and irradiating the coated liquid crystal layer; binding together the two or more liquid crystal films so that their selective light-reflecting central wavelengths do not neighbor one another; and mounting a quarter wave ($\lambda/4$) retardation film on top of the bound liquid crystal films.

The above and other objects and advantages of the present invention will be described below and will become more apparent from the following detailed description and the examples of the invention.

BRIEF DESCRIPTION OF THE DRAWINGS

FIG. 1 shows polarization films produced by the methods according to the present invention, wherein

FIG. 4 shows liquid crystal display elements in which polarization films having the structures depicted in FIGS. 1a and 1b are arranged, wherein

DETAILED DESCRIPTION OF THE INVENTION

The following is a detailed description of the preferred embodiments of the present invention, with reference to the attached drawings.

Figure 1A:
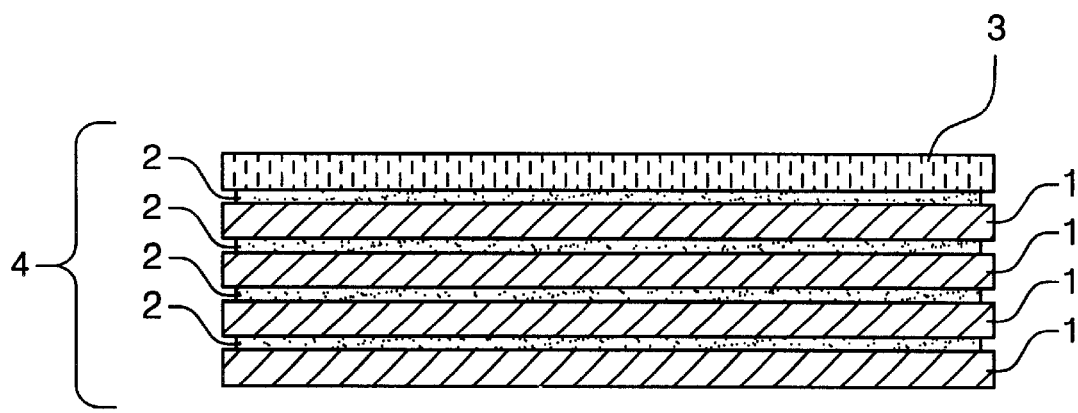
FIG. 1a shows the plural liquid crystal film layers provided with a quarter wave ($\lambda/4$) retardation film on their top and FIG. 1b shows the plural liquid crystal film layers without a retardation film.
Figure 1B:
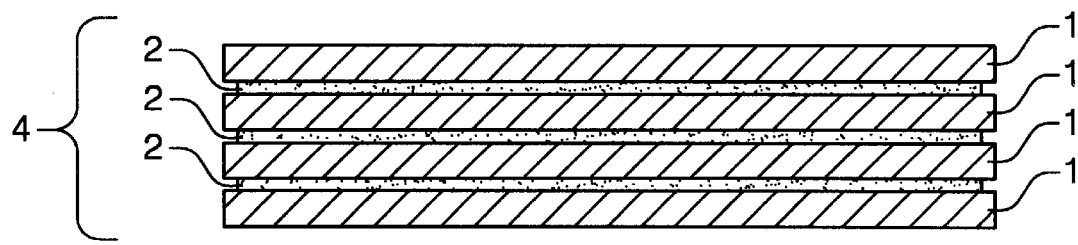

As seen in FIG. 1a or 1b, polarization film 4 manufactured by a method according to the present invention has plural liquid crystal films 1 that are laminated together. Binder layers 2 are interposed between two adjacent liquid crystal films 1. Polarization film 4 may be provided either with quarter wave ($\lambda/4$) retardation film 3 on the top of laminated liquid crystal films 1, as depicted in FIG. 1a, or without it, as in FIG. 1b. Quarter wave ($\lambda/4$) retardation film 3 functions to convert the circular polarized light into a linear one.

Accordingly, the polarized light that has passed polarization film 4 having quarter wave ($\lambda/4$) retardation film 3 on laminated liquid crystal films 1, as in FIG. 1a, will comprise a linear polarized light, while the polarized light that has passed polarization film 4 consisting of only laminated liquid crystal films 1, as in FIG. 1b, will comprise a circular polarized light.

First, the process for manufacturing liquid crystal film 1 will be discussed.

It is important to choose various cholesteric liquid crystal monomers that have selective light-reflecting central wavelengths different from one another. Such crystals can be prepared either by using cholesteric liquid crystals that have selective light-reflecting central wavelengths different from one another or by using cholesteric liquid crystals in which the selective light-reflecting central wavelengths have been adjusted through the addition of nematic liquid crystals to the cholesteric liquid crystals having a specific selective light-reflecting central wavelength, for example 390 nm, at a certain mixing ratio. Generally, addition of a minor amount of nematic liquid crystals to the cholesteric liquid crystals results in cholesteric liquid crystals.

Preferably, the mixing ratio of cholesteric liquid crystals to nematic liquid crystals is in the range of between 0.9:1 and 9.5:1 in order to vary the central wavelength of selective reflection by 390 nm–900 nm. The lower limit for the amount of nematic liquid crystals added to the cholesteric liquid crystals is 1% by weight. Below 1% by weight, the change in the central wavelength of selective reflection from the nematic liquid crystals is impossible. In deciding the mixing ratio, it is to be noted that the central wavelength of selective reflection moves toward the longer wavelength as the nematic crystal content increases.

At least two cholesteric liquid crystals having different selective light-reflecting central wavelengths, prepared as described above, are coated on respective substrates to provide corresponding coated liquid crystal layers. The substrates are preferably polyethyleneterephthalate (PET) films. In the coating step, it is preferred to first dissolve the liquid crystal substance in a non-polar solvent such as toluene, cyclohexane, or the like for easy and uniform coating. As a matter of course, it is also possible to use the liquid crystal substance without dissolving it in solvent. The thickness of the coated liquid crystal layer should be properly chosen in consideration of the reflectivity of the polarization film to be produced.

After coating the cholesteric liquid crystals on the substrates, the coated liquid crystal layers are subjected to a photopolymerization process comprising adding a photopolymerization initiator such as IG184 (available from Ciba-Geigy) to the coated liquid crystal layers and then irradiating them with a UV ray (20 mW/cm$^2$) at 365 nm. As a result, cholesteric liquid crystal films having at least two different central wavelengths of selective reflection are produced. Preferably, the amount of photopolymerization initiator used is more than 0.1% by weight based on the liquid crystal.

When the manufacture of cholesteric liquid crystal films is completed, the films are arranged in such a manner that a film having a central wavelength of selective reflection is not located in contiguity with another film having the central wavelength of selective reflection, which latter central wavelength neighbors the former central wavelength in the order of measurement of the central wavelengths for all the crystal films to be bound. In other words, the order in which the cholesteric liquid crystal films are bound should be so controlled that the central wavelengths of selective reflection for any adjacent liquid crystal films do not overlap with or are not contiguous to one another. This is very important in realizing the improvement in the wide band characteristics of a polarization film as the principal goal of the present invention.

Upon deciding the binding order of the liquid crystal films, the films are bound together in accordance with that order. An adhesive may be used to bind the liquid crystal films together. The adhesive should have a refractive index similar to that of the liquid crystal to minimize the loss of the light.

Instead of using adhesive, the binding can be achieved using thermal binding at 70–100° C. Further, it is also possible to form a polarization film consisting of only the liquid crystal films and not the substrates by removing the substrates before the binding step.

As described above, the laminated liquid crystal films can have a quarter wave ($\lambda/4$) retardation film attached on the top thereof to convert a circular polarized light into a linear polarized light.

The polarization film(s) produced as described above can be placed on both sides or on either of the sides of the liquid crystal cells to manufacture a liquid crystal display element. The following is a detailed description of the construction of a liquid crystal display element arranged with the polarization films produced according to the present invention.

Figure 4A:
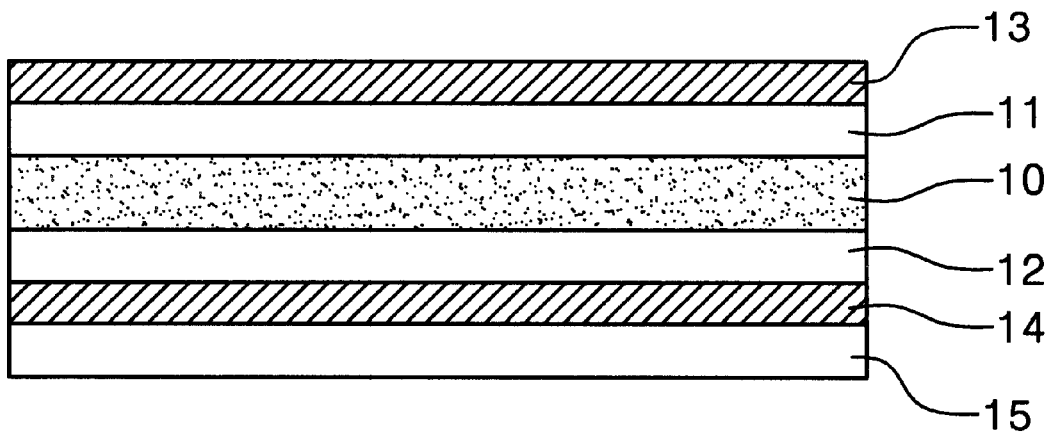
FIG. 4a illustrates a reflection-type liquid crystal display element and FIG. 4b illustrates a transmission-type liquid crystal display element.
Figure 4B:
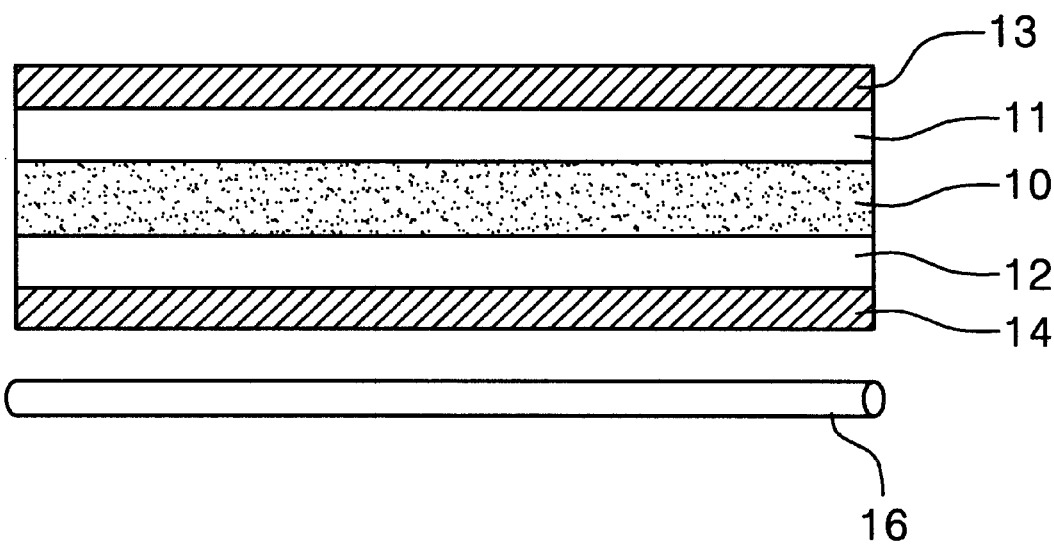

Generally, the liquid crystal display element can be classified as a reflection-type liquid crystal display element or a transmission-type liquid crystal display element, wherein the former is depicted in FIG. 4a and the latter is depicted in FIG. 4b.

Referring first to FIG. 4a, a reflection-type liquid crystal display element is constructed by interposing liquid crystal cell 10 between first and second glass substrates 11 and 12 and disposing first and second polarization films 13 and 14 on the outside of first and second glass substrates 11 and 12. Polarization films 13 and 14 are the lamination-type wide band polarization films according to the present invention, as depicted in FIGS. 1a or 1b.

On the outside of second polarization film 14, there is arranged a reflector plate 15.

Now referring to FIG. 4b, the transmission-type liquid crystal display element is constructed essentially in the same manner as the above-described reflection-type liquid crystal display element except that backlight 16, which is a light source, is disposed on the outside of second polarization film 14.

The liquid crystal display element provided with the lamination-type wide band polarization films of the present invention has improved luminance through reuse of reflected lights.

The invention will be further described by reference to the following detailed examples. The examples are set forth by way of illustration and are not intended to limit the scope of the invention.

EXAMPLE 1

Figure 2:
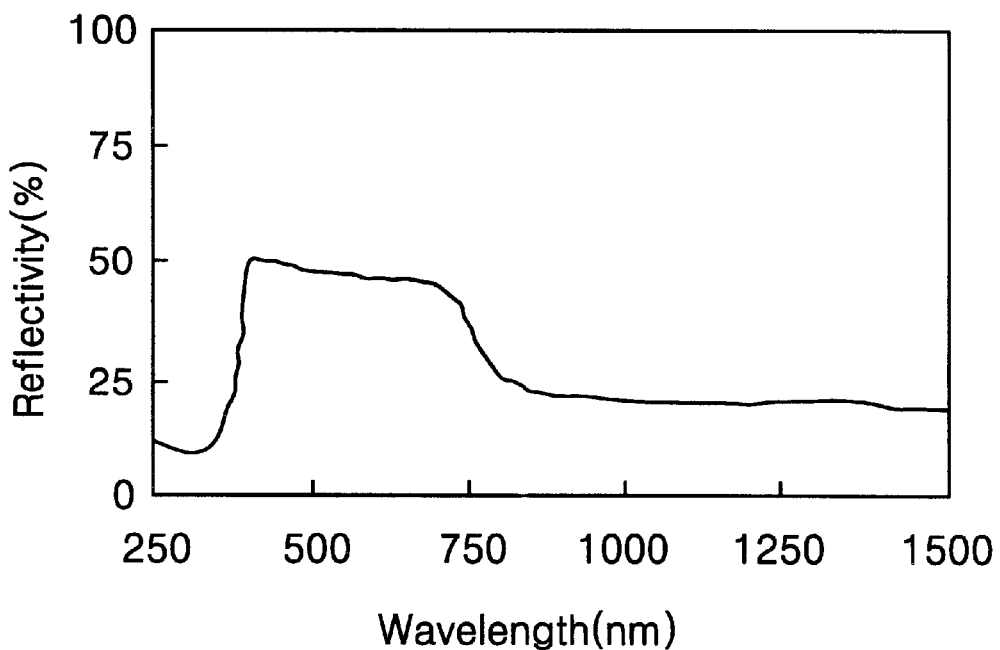
FIG. 2 shows an ultraviolet spectrum of a polarization film produced in accordance with the first example of the present invention.

A liquid crystal layer is made by coating a cholesteric liquid crystal monomer having the central wavelength of selective reflection of 390 nm on a 10 $\mu$m-thick PET film. About 3% by weight of a photopolymerization initiator (IG184 available from Ciba-Geigy) is added to the liquid crystal layer. A liquid crystal film is obtained by irradiating the liquid crystal layer with an ultraviolet ray of 365 nm at an intensity of 20 mW/cm$^2$. Three additional liquid crystal layers having respective central wavelengths of selective reflection of 490 nm, 595 nm and 700 nm are prepared by coating a mixture of the same cholesteric liquid crystal monomer as used above and nematic liquid crystals at the ratios of 3:1, 1.8:1, and 1.2:1, respectively, on 10 $\mu$m-thick PET films. The three additional liquid crystal layers are made into liquid crystal films by adding about 3% by weight of a photopolymerization initiator (IG184 available from Ciba-Geigy) to the liquid crystal layers and irradiating the liquid crystal layers with an ultraviolet ray of 365 nm at an intensity of 20 mW/cm$^2$. The PET films used as substrates are removed. The so prepared liquid crystal films are then bound together into a polarization film covering the range of visible lights through a lamination process using adhesive in the following order: 490 nm, 700 nm, 390 nm and 595 nm. The ultraviolet spectrum for the produced polarization film is shown in FIG. 2.

EXAMPLE 2

A liquid crystal film is made as in Example 1. Five additional liquid crystal films having respective central wavelengths of selective reflection of 490 nm, 595 nm, 700 nm, 790 nm and 870 nm are prepared as in Example 1, with the ratios of cholesteric liquid crystal monomer to nematic liquid crystals being, respectively, 3:1, 1.8:1, 1.2:1, 0.98:1 and 0.92:1. The PET films used as substrates are removed. The so prepared liquid crystal films are then bound together into a polarization film as in Example 1 in the following order: 490 nm, 700 nm, 390 nm, 870 nm, 595 nm and 790 nm. The reflection range of the produced polarization film is 390–900 nm, and the reflectivity is over 46%.

EXAMPLE 3

A liquid crystal film is made as in Example 1, except that the PET film has a thickness of 6–7 $\mu$m. Four additional liquid crystal films having respective central wavelengths of selective reflection of 490 nm, 595 nm, 700 nm and 790 nm are prepared as in Example 1, with the ratios of cholesteric liquid crystal monomer to nematic liquid crystals being, respectively, 3:1, 1.8:1, 1.2:1 and 0.98:1 and the thickness of the PET films being 6–7 $\mu$m. The PET films used as substrates are removed. The so prepared liquid crystal films are then bound together into a polarization film as in Example 1 in the order of 390 nm, 700 nm, 490 nm, 790 nm and 595 nm. The reflection range of the produced polarization film is 390–810 nm, and the reflectivity is over 39–43%.

EXAMPLE 4

A liquid crystal film is made as in Example 1, except that the PET film has a thickness of 13 $\mu$m. Four additional liquid crystal films are prepared as in Example 3, except that the thickness of the PET film is 13 $\mu$m. The PET films used as substrates are removed. The so prepared liquid crystal films are then bound together into a polarization film as in Example 1 in the order of 595 nm, 390 nm, 790 nm, 490 nm and 700 nm. The reflection range of the produced polarization film is 390–810 nm, and the reflectivity is over 46%.

EXAMPLE 5

A liquid crystal film is made as in Example 1. Four additional liquid crystal films having respective central wavelengths of selective reflection of 505 nm, 610 nm, 700 nm and 790 nm are prepared as in Example 1, with the ratios of cholesteric liquid crystal monomer to nematic liquid crystals being, respectively, 2.7:1, 1.6:1, 1.2:1 and 0.98:1. The PET films used as substrates are removed. The so prepared liquid crystal films are then bound together into a polarization film as in Example 1 in the order of 505 nm, 700 nm, 390 nm, 610 nm and 790 nm. The reflection range of the produced polarization film is 390–810 nm, and the reflectivity is over 46%.

COMPARATIVE EXAMPLE

A liquid crystal film is made as in Example 1. Three additional liquid crystal films are prepared as in Example 1. The PET films used as substrates are removed. The so prepared liquid crystal films are then bound together into a polarization film as in Example 1, except that the order of the films is 390 nm, 490 nm, 595 nm and 700 nm. The ultraviolet spectrum for the produced polarization film is shown in FIG. 3.

Figure 3:
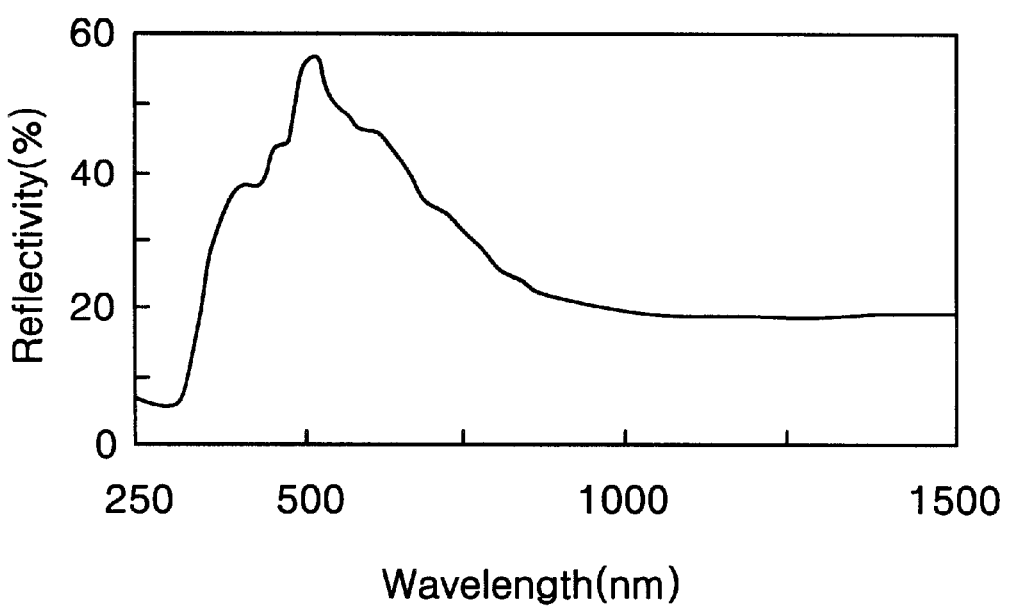
FIG. 3 shows an ultraviolet spectrum of a polarization film produced in accordance with a comparative example.

A comparison of the curve in FIG. 2 for Example 1 of the invention with the curve in FIG. 3 for the Comparative Example reveals that, in the case of the polarization film for Example 1, the reflectivity is close to 50% over a wide wavelength range of 380 to 720 nm, while in the case of the Comparative Example the reflectivity is close to 50% only for a narrow wavelength range. In other words, in the polarization film of Example 1, the reflectivity band in the vicinity of the central wavelength flatly approaches the reflectivity corresponding to the central wavelength over a much wider wavelength range than in the case of polarization film for the Comparative Example.

As is clear from the above description, the polarization film manufactured according to the present invention can deal with wavelengths over the range of 400–800 nm for visible light and also has an improved reflectivity, whereby the polarization efficiency of the polarization film is enhanced.

Having now fully described the invention, it will be apparent to one of ordinary skill in the art that changes and modifications can be made thereto without departing from the spirit or scope of the invention as set forth herein.

What is claimed is:

1. A method for manufacturing a polarization film having wide band characteristics, comprising:
   (a) forming two or more photopolymerized, cholesteric liquid crystal films having selective light-reflecting central wavelengths different from one another comprising,
      (1) forming a coated liquid crystal layer by coating cholesteric liquid crystals having selective light-reflecting central wavelengths different from one another on respective substrates,
      (2) adding photopolymerization initiator to the coated liquid crystal layer, and
      (3) irradiating the coated liquid crystal layer; and
   (b) binding together the two or more liquid crystal films so that the selective light-reflecting central wavelengths of the films do not neighbor one another;
   wherein the cholesteric liquid crystals are produced by adding nematic liquid crystals to the cholesteric liquid crystals with a definite selective light-reflecting central wavelength at predetermined mixing ratios, and
   wherein the cholesteric liquid crystal are coated on the substrate after being dissolved in non-polar solvent.

2. The method according to claim 1, further comprising the step of separating the polymerized liquid crystal films from said substrates before binding the films together.

3. The method according to claim 1, wherein the amount of nematic liquid crystals mixed with the cholesteric liquid crystals is more than 1% by weight.

4. The method according to claim 1, wherein the amount of the photopolymerization initiator added to the coated liquid crystal layer is more than 0.1% by weight.

5. The method according to claim 1, wherein the substrates include polyethyleneterephthalate films.

6. The method according to claim 1, wherein the binding of the two or more liquid crystal films is performed through thermal binding.

7. The method according to claim 1, wherein the binding of the two or more liquid crystal films is performed using an adhesive.

8. The method according to claim 7, wherein the adhesive has a refractive index equal or similar to that of the liquid crystal.

9. The method according to claim 1, wherein the irradiation step comprises irradiating with an ultraviolet ray of 365 nm.

10. The method according to claim 1, wherein the mixing ratio of said cholesteric liquid crystals to said nematic liquid crystals is in the range of about 0.9:1 to 9.5:1.

11. A liquid crystal display element having a liquid crystal cell between two glass substrates, wherein on the outside of the respective glass substrates, lamination type wide-band polarization films produced according to claim 1 are each disposed.

12. The method according to claim 1, wherein the non-polar solvent is selected from the group consisting of toluene and cyclohexane.

13. A method for manufacturing a polarization film having wide band characteristics, comprising:
   (a) forming two or more photopolymerized, cholesteric liquid crystal films having selective light-reflecting central wavelengths different from one another comprising,
      (1) forming a coated liquid crystal layer by coating cholesteric liquid crystals having selective light-reflecting central wavelengths different from one another on respective substrates,
      (2) adding photopolymerization initiator to the coated liquid crystal layer, and
      (3) irradiating the coated liquid crystal layer; and
   (b) binding together the two or more liquid crystal films so that the selective light-reflecting central wavelengths of the films do not neighbor one another; and
   (c) mounting a quarter wave ($\lambda/4$) retardation film on top of the bound liquid crystal films;
   wherein the cholesteric liquid crystals are produced by adding nematic liquid crystals to the cholesteric liquid crystals with a definite selective light-reflecting central wavelength at predetermined mixing ratios, and
   wherein the cholesteric liquid crystal are coated on the substrate after being dissolved in non-polar solvent.

14. The method according to claim 13, further comprising separating the polymerized liquid crystal films from said substrates before binding the films together.

15. The method according to claim 13, wherein the amount of nematic liquid crystals mixed with the cholesteric liquid crystals is more than 1% by weight.

16. The method according to claim 13, wherein the amount of the photopolymerization initiator added to the coated liquid crystal layer is more than 0.1% by weight.

17. The method according to claim 13, wherein the substrates include polyethyleneterephthalate films.

18. The method according to claim 13, wherein the binding of the two or more liquid crystal films is performed through thermal binding.

19. The method according to claim 13, wherein the binding of the two or more liquid crystal films is performed using an adhesive.

20. The method according to claim 19, wherein the adhesive has a refractive index equal or similar to that of the liquid crystal.

21. The method according to claim 13, wherein the irradiation step comprises irradiating with an ultraviolet ray of 365 nm.

22. The method according to claim 13, wherein the mixing ratio of said cholesteric liquid crystals to said nematic liquid crystals is in the range of about 0.9:1 to 9.5:1.

23. A liquid crystal display element having a liquid crystal cell between two glass substrates, wherein on the outside of the respective glass substrates, lamination type wide-band polarization films produced according to claim 13 are each disposed.

24. The method according to claim 13, wherein the non-polar solvent is selected from the group consisting of toluene and cyclohexane.

* * * * *